UNITED STATES PATENT OFFICE.

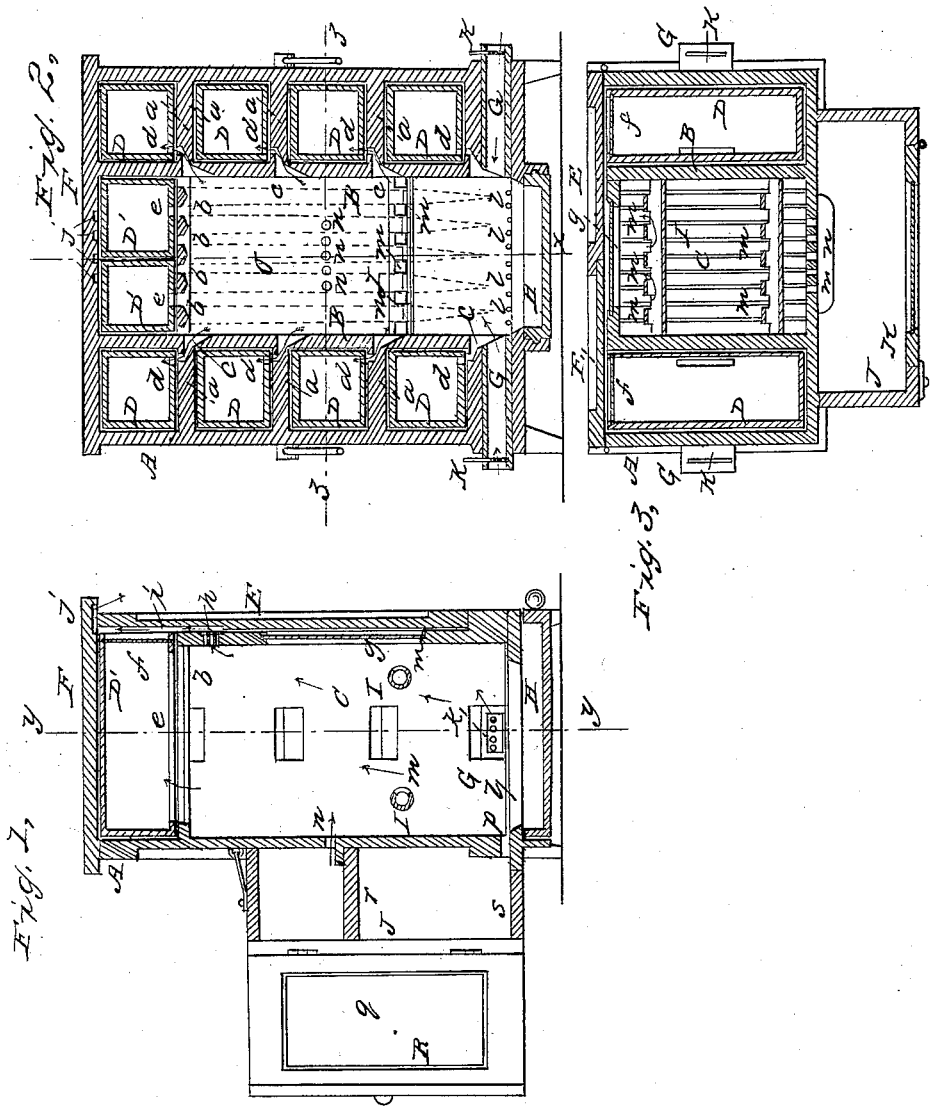

JOSEPH D. SANDERSON, OF STETSON, MAINE.

BEEHIVE.

Specification of Letters Patent No. 22,309, dated December 14, 1858.

*To all whom it may concern:*

Be it known that I, JOSEPH D. SANDERSON, of Stetson, in the county of Penobscot and State of Maine, have invented certain new and useful Improvements in Beehives; and I do hereby declare that the following is a full, clear, and exact description of the same, reference being had to the annexed drawings, making a part of this specification, in which—

Figure 1, is a vertical section of my improvement taken in the line $(x)$ $(x)$ Fig. 2. Fig. 2, is also a vertical section of ditto, taken in the line $(y)$, $(y)$, Fig. 1. Fig. 3, is a horizontal section of ditto, taken in the line $(z)$ $(z)$ Fig. 2.

Similar letters of reference indicate corresponding parts in the several figures.

This invention consists in a novel means or arrangement of parts for ventilating the hive and excluding the rain.

To enable those skilled in the art to fully understand and construct by invention I will proceed to describe it.

A represents a rectangular box in which two vertical partitions B, B, are placed so as to form three compartments the central one C, being the hive proper, the end or side compartments being provided with horizontal partitions $(a)$ at equal distances apart so as to form recesses or chambers to receive spare honey boxes D. Two spare honey boxes D', D', are also placed over the hive C, said boxes resting on a series of slats $(b)$ which form the top of the hive and to which the bees attach the combs.

The boxes D, are allowed to slide freely in and out of the recesses in which they are placed, and the partitions B, B, have openings $(c)$ made through them, said openings registering with openings $(d)$ in the boxes D, as shown clearly in Fig. 2. Access is had to the boxes D', through the spaces between the slats $(b)$ and openings $(e)$ made in the bottoms of said boxes. The back ends of the boxes D, D', are formed of glass $(f)$ and the back of the hive C, has a glass $(g)$ inserted in it, see Figs. 1 and 3. To the back of the box A, doors E, E, are hung and by opening these doors at any time the condition of the hive C, and spare boxes D, D', may be seen.

Through the back of the hive C, and near its upper part a suitable number of holes $(h)$ are made. These holes when the doors E, E, are closed communicate with the lower ends of vertical grooves $(i)$ made in the doors at their upper parts and the upper ends of the grooves $(i)$ when the doors are closed communicate with grooves $(j)$ made in the under side of the top F of the box A, the grooves $(j)$ being rather longer than the doors are thick so as to communicate with the external air, and at the same time prevent the rain from entering, see Fig. 1.

G, G, are tubes or boxes which are fitted one in each side of the box A. These boxes communicate with the lower part of the hive C. Each tube or box G, is provided at its outer end with a perforated plate $(k)$. These plates are allowed to slide vertically in the ends of the tubes or boxes so that said boxes may be fully opened at their outer ends when desired.

The bottom of the hive C, is formed of wire or rods $(l)$ and a drawer H is fitted underneath the hive to receive the filth therefrom. Within the hive C, two horizontal tubes I, I, are placed. These tubes are perforated with holes $(m)$ a hole $(m)$ being in lines between the slats $(b)$ so that when the combs are built, the combs being suspended from the slats $(b)$, the holes $(m)$ will be in the spaces between the combs,— see Fig. 2, the combs being shown in red. Through the front side of the box A a series of holes $(n)$ are made. These holes are about midway between the upper and lower ends of the hives. A series of holes $(p)$ are also made through the lower part of the front side of the hive. These holes are the entrances to the hives.

J, is a rectangular box provided with a door K, having a glass $(q)$ fitted therein. This box is fitted to the front side of the hive so as to inclose the entrances $(n)$, $(p)$, the box being provided with a partition or shelf $(r)$ to serve as an alighting board for the holes $(n)$, the bottom $(s)$ of box J, serving the same purpose for the lower holes $(p)$, see Fig. 1.

When it is necessary to feed the bees the food may be placed within the box J, and its door K may be closed and the hive will be protected from robbers, that is, the depredations of bees belonging to adjoining or other hives, bees being often tempted to rob when food is placed at the entrances of hives. The food it will be understood is placed in the box J, when the bees are all in the hive C, and the door K is then closed.

The hive is kept properly ventilated as a circulation of air is allowed to pass through it, the air passing through the boxes G, G, up through the holes ($h$) and thence up through the grooves ($i$) in the doors E, E, into the grooves ($j$) in the under side of the top F, as indicated by the black arrows Fig. 1, the rain being prevented from entering the hive in consequence of the position of the grooves ($j$). By means of the perforated tubes I, I, the bees are allowed to pass directly into either of the spaces between the combs, said tubes forming central passages, connecting with the several spaces. In the usual hives the bees are compelled to travel downward and pass around the lower edges of the combs in order to get from one space into another. Consequently by the employment of these tubes a great saving of time is effected the bees being allowed to work more rapidly.

I do not claim the employment or use of spare honey boxes placed around a hive and communicating with it, for these have been previously used, neither do I claim broadly ventilating the hive by having a current of air passing vertically through it by means of apertures or openings at the top and bottom for this has been previously done; nor do I claim the perforated horizontal tubes I, I, nor the box J, but,

Having thus described my invention what I claim as new and desire to secure by Letters Patent, is—

The holes ($h$) in the back of the hive communicating with the grooves ($i$) in the doors E, E, and the grooves ($j$) in the under side of the top F, of the box A in connection with the boxes G provided with perforated plates ($k$) whereby the hive is perfectly ventilated and the rain excluded.

J. D. SANDERSON.

Witnesses:
CHARLES H. STARKEY,
JOHN ROGERS.